Sept. 19, 1950     C. M. GOLDAMMER ET AL     2,522,867
DEMOUNTABLE WHEEL SUSPENSION
Filed Jan. 17, 1947     2 Sheets-Sheet 1
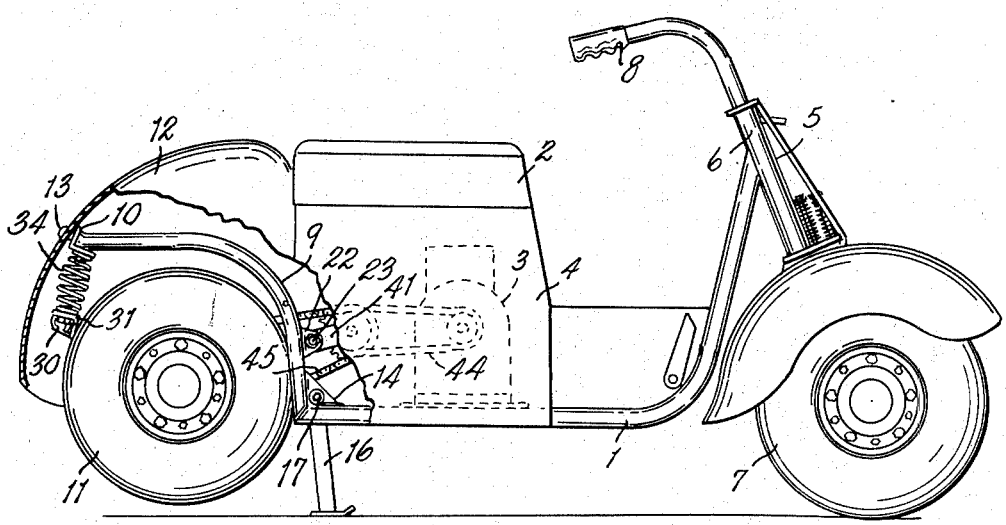
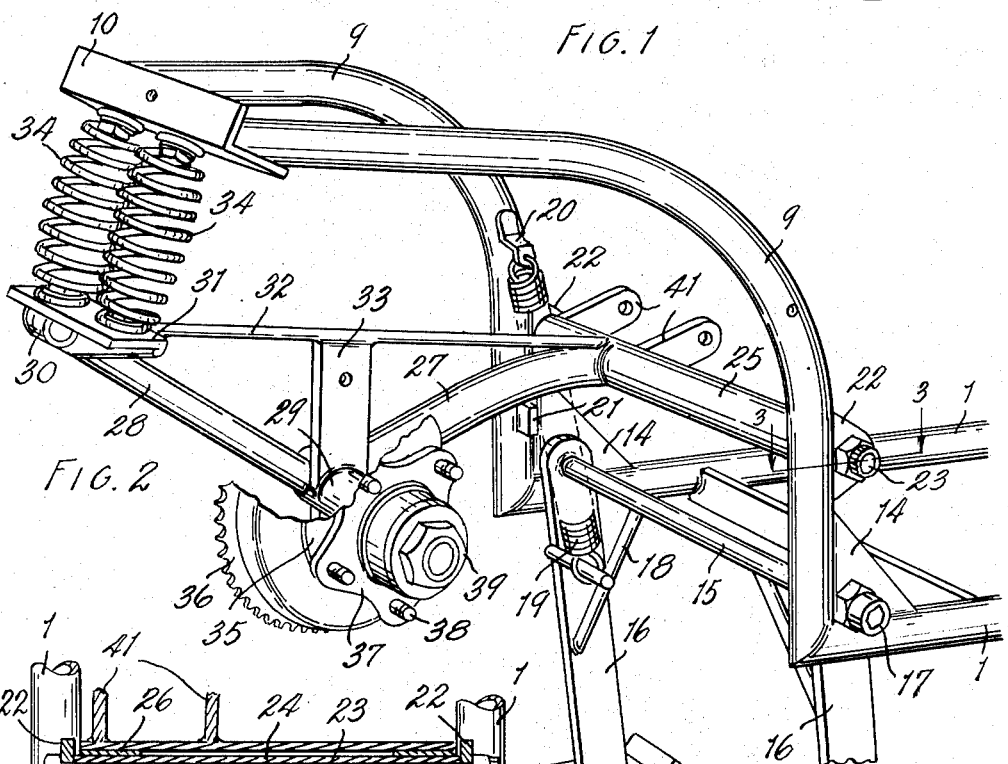
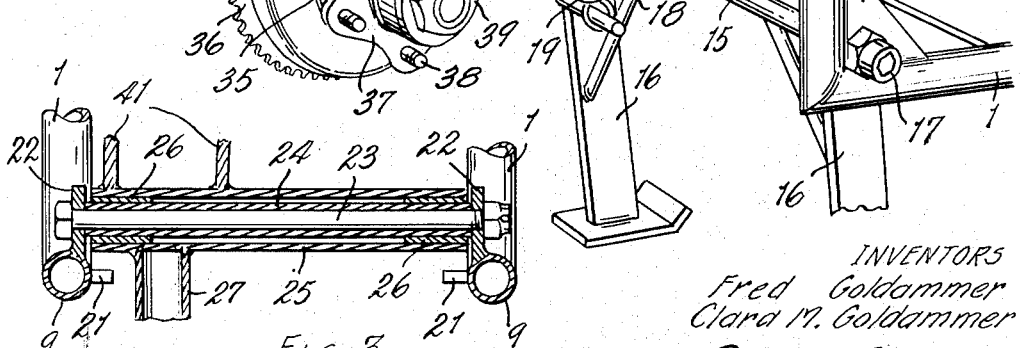
INVENTORS
Fred Goldammer
Clara M. Goldammer
By *Otto a Earl*
Attorney Sept. 19, 1950   C. M. GOLDAMMER ET AL   2,522,867
DEMOUNTABLE WHEEL SUSPENSION
Filed Jan. 17, 1947   2 Sheets-Sheet 2
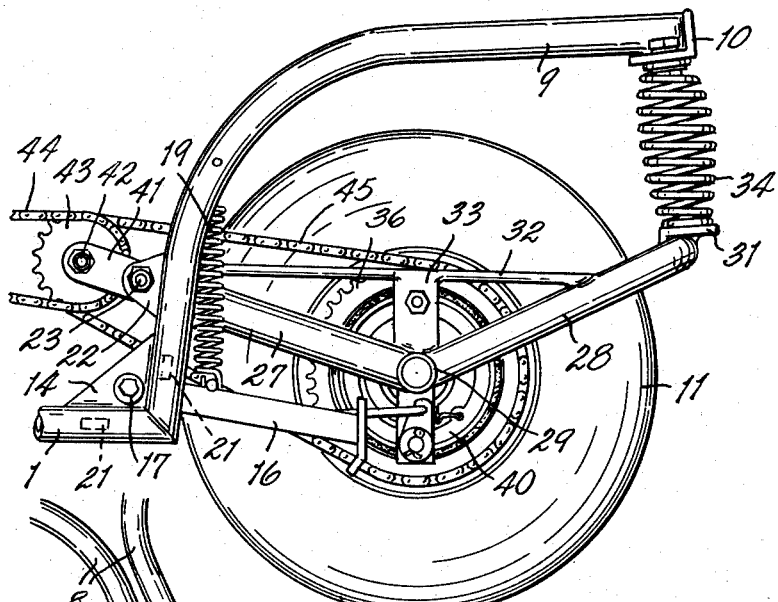
FIG. 4
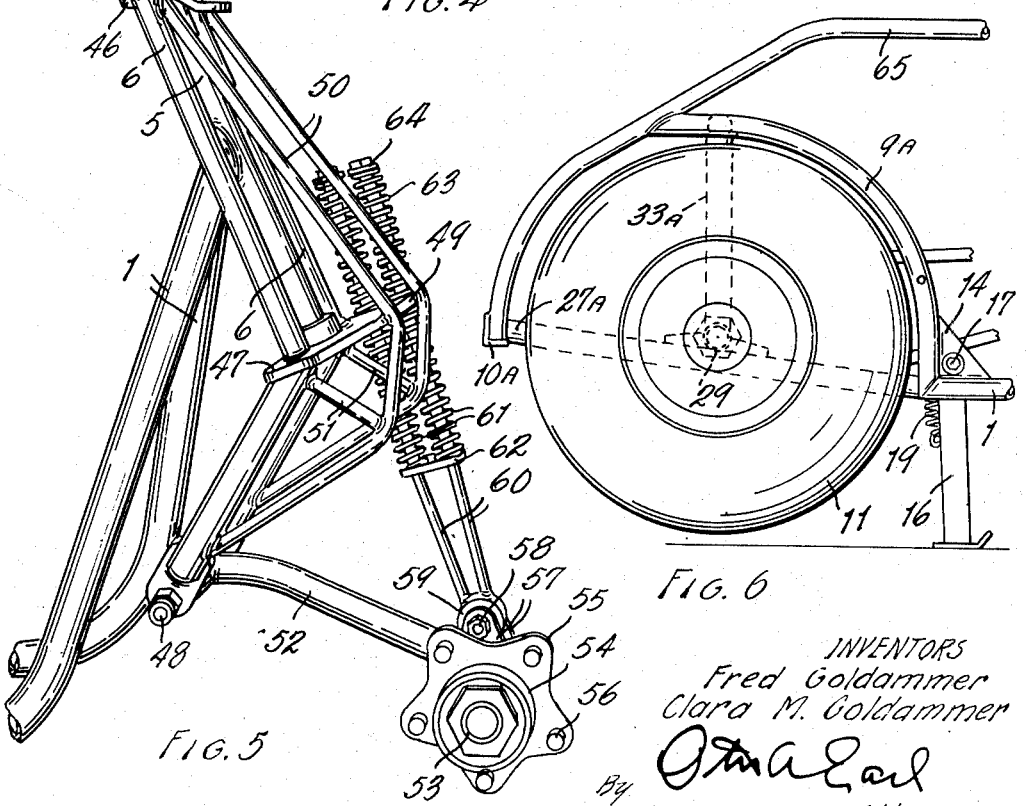
FIG. 5
FIG. 6
INVENTORS
Fred Goldammer
Clara M. Goldammer
By John A. Earl
Attorney.

Patented Sept. 19, 1950

2,522,867

UNITED STATES PATENT OFFICE 2,522,867

DEMOUNTABLE WHEEL SUSPENSION

Clara M. Goldammer and Fred Goldammer, Eureka Springs, Ark.

Application January 17, 1947, Serial No. 722,734

11 Claims. (Cl. 180—32)

This invention relates to improvements in a demountable wheel suspension.

The principal objects of this invention are:

First, to provide inexpensive wheel suspension mechanism for the rear wheels of motor scooters which will permit the wheels and tires to be readily demounted without disconnecting the driving connections to the wheels or the frame members of the scooter.

Second, to provide wheel suspension structure for the wheels of a motor scooter which permits the use of springs to cushion the ride of the scooter.

Third, to provide an inexpensive suspension system for the rear wheel of a motor scooter by means of which the wheel may be spring mounted without interfering with the driving connections between the motor and the wheel.

Fourth, to provide mounting structure for the driving chain or belt of a spring mounted scooter wheel which will maintain a substantially constant tension and alignment of the chain as the wheel passes over uneven ground.

Fifth, to provide a simplified form of rigid wheel mounting for a motor scooter by means of which the tire and wheel may be readily removed from the scooter without disconnecting any of the frame members.

Other objects and advantages relating to the invention will be apparent from the following description and claims.

The drawings, of which there are two sheets, illustrate a preferred method of mounting the front and rear wheels of a motor scooter and a modified form of wheel suspension for the rear wheel of the scooter.

Fig. 1 is a right side elevational view of a motor scooter having its wheels mounted thereon with our suspension system, a portion of the closure panels of the scooter being broken away to illustrate the mounting of the rear wheel.

Fig. 2 is a fragmentary perspective view illustrating the rear wheel suspension structure on the frame members of the scooter.

Fig. 3 is a fragmentary cross sectional view along the line 3—3 in Fig. 2.

Fig. 4 is a fragmentary left side elevational view of the rear wheel suspension structure and driving connections.

Fig. 5 is a fragmentary perspective view of the front wheel suspension structure, the tire, wheel and mud guard being removed.

Fig. 6 is a fragmentary right side elevational view of a modified form of wheel suspension for the rear wheel of a motor scooter.

Our invention is designed primarily for use in light-weight motor scooters of the bicycle type driven by a small motor positioned underneath the driver's seat and provided with small diameter wheels and wide base tires. Our scooter as illustrated in the drawings includes parallel side frame members 1 on which are mounted the seat 2 and a motor illustrated conventionally at 3 which is positioned under the seat and enclosed by suitable panels 4. The frame members 1 are joined together in the front to support a tubular steering head 5 for the journal portion of the front wheel fork 6 which is rotatable therein. The front fork 6 carries the steerable front wheel 7 and the upper ends of the fork are bent outwardly and backwardly to form the handle bars 8. The rear ends of the side frame member 1 are connected to the upwardly and backwardly extending back frame members 9. The rear ends of the back frame members are connected by a spring plate 10 of angular cross section. The rear frame members are thus positioned over the rear wheel 11. A rear mud guard 12 is positioned over the rear frame members and the rear wheel and removably secured to the frame members by suitable bolts 13.

The connections between upwardly extending portions of the rear frame members 9 and the side frame member 1 are reenforced by the gusset plates 14 which are apertured to receive the ends of a rod 15. The rod 15 is provided with a jack stand 16 and is rotatable in the gusset plates 14 by application of a suitable wrench to the socket head 17 formed on the rod. The jackstand 16 is braced to the rod 15 by other rods 18, one of which also forms a connection for the lower end of a coil spring 19 secured at its upper end to a clip 20 on the left rear frame member.

The rod 15 thus performs the dual function of connecting the rear ends of the frame members 1 and rotatably supporting the jackstand 16 so that it may be rotated upwardly to the rear and held in place against the stops 21 when not in use. The legs of the jackstand are made long enough to support the rear end of the scooter with the rear wheel off the ground.

Above the rod 15 the upwardly extending portions of the rear frame members are provided with forwardly extending ears 22 which are apertured to receive the ends of the tie bolt 23 which extends therebetween. A stationary spacer sleeve 24 is positioned around the tie bolt and clamped between the ears 22 and acts as a journal bearing for the tube 25 positioned therearound. Bushings 26 are provided on each end of the spacer sleeve for rotatably supporting the tube 25. The tube 25 forms an oscillatable support for the rearwardly extending suspension arm 27 which is welded to the tube 25. The arm 27 is angular in shape having an upwardly and rearwardly extending branch 28, the adjacent ends of the branches 27 and 28 being secured to a tubular stub axle 29 which forms the axle for the rear wheel 11. The rear end of the branch 28 is bent to the left as at 30 and secured to an angular spring plate 31 and the arm is stiffened by the tie rod 32 and strut 33.

Coil springs 34 are connected between the angular plate 31 and the plate 10 on the rear ends of the rear frame members to yieldingly support the rear end of the suspension arm from the frame of the scooter. The arm 27 is thus oscillatable about the spacer sleeve 24 and bearings 26, its motion being cushioned by the springs 34.

The stub axle 29 is machined to receive the hub member 35 of the rear wheel, the hub being provided with a driving gear 36 and flanges 37 to which are secured the stud bolts 38 for attaching the wheel 11 to the hub. A suitable hub nut and washer 39 are provided for retaining the hub and wheel on the axle 29. Suitable brake mechanism is mounted on the hub as indicated at 40. (See Fig. 4).

Secured to the forward side of the tube 25 and near the left end thereof are a pair of spaced arms 41 which are apertured to receive a countershaft 42 on which is mounted the sprocket gears 43 (see Fig. 4). The gears 43 are connected to the motor of the scooter by a chain 44 and to the driving gear 36 by chain 45. As the arm 27 and stub axle 29 move vertically with respect to the frame of the scooter as it passes over uneven ground, the arms 41 and countershaft 42 will rotate relative to the frame and the motor, the sprocket gears 43 and driving gear 36 maintaining constant relative positions so that there is no variation in the tension of the driving chain 45. Since the arms 41 are relatively short compared to the radius arm of the stub axle 29 about the tube 25, the countershaft 42 and gears 43 will have a relatively small movement with respect to the frame of the scooter and the motor carried thereon. Therefore, this movement of the sprocket gears 43 relative to the motor may be readily accommodated by the intermediate driving chain 44. Movement of the sprocket gears 43 could be entirely eliminated by mounting them on the tube 25 but this would require expensive forming and machining operations on the tube. The structure shown requires only the ears 41 and a short countershaft which are inexpensive to produce and obtain satisfactory results, without machining the whole tube.

The front fork members 6 are connected intermediate of their ends by an upper crown plate 46 and a lower crown plate 47 which support the journal bearing rotatable in the steering head 5 carried on the front of the frame members 1. Above the upper crown plate 46 the fork members separate to form the handle bars 8 and below the lower crown plate 47, the fork members are bent backwardly and converge at their lower ends to receive a pivot pin 48. The front edge of the lower crown plate 47 is extended as at 49 to support the mid-sections of brace rods 50 which extend from the upper crown plate to the lower ends of the fork members and are welded thereto. Struts 51 cooperate with the crown plate 47 to interbrace the brace rods 50 and fork members 6.

The pivot pin 48 rotatably supports a front suspension arm 52, the front end of which carries a stub axle 53 for rotatably supporting the front hub 54. The hub 54 is provided with flanges 55 and studs 56 for attaching the front wheel 7 to the hub.

The free end of the front arm 52 is also provided with upwardly extending ears 57 which are apertured to receive the bolt 58 for securing a short cylindrical shackle 59 therebetween. The shackle 59 is welded to the lower ends of guide rods 60 which extend upwardly through holes formed in the left side of the lower crown plate 47. Suspension springs 61 are provided around the guide rods 60 and between the lower crown plate 47 and a tie plate 62 welded to the rods 60 to cushion the upward movement of the wheel and arm 52 relative to the frame of the scooter.

Rebound springs 63 are positioned around the guide rods 60 and between the upper side of the lower crown plate and nuts and washers 64 secured to the upper ends of the guide rods.

It will thus be seen that the front suspension arm 52 and wheel 7 may be rotated upwardly about the pivot pin 48 against the compression of the springs 61 as the wheel passes over a bump to cushion the ride of the scooter. At the same time the front wheel may be steered by turning the handle bars 8 and fork members 6 which support the front wheel about the journal pin positioned in the steering head 5. At the same time the front wheel 7 is readily removable from the hub 54 by unscrewing the wheel lugs from the studs 56 and removing the wheel from the flange 55 without disconnecting any of the frame members of the scooter.

Fig. 6 illustrates a modified form of the rear wheel mount in which the upwardly extending portions of the rear frame member 9A extend over the rear of the wheel 11 and are connected to a top frame member 65 which extends upwardly over the motor of the scooter and downwardly behind the wheel to an angle plate 10A corresponding to the angle plate 10 in the preferred form of the invention. The angle plate 10A is connected on the left side of the scooter to an arm 27A which extends forwardly and is rigidly connected to the rear end of the left side member 1. The arm 27A is thus rigidly connected to the frame members and is further braced at its midpoint by a strut 33A which extends upwardly to the left rear frame member 9A. The arm 27A and strut 33A are rigidly connected to each other and to the stub axle 29 on which the hub 35 is mounted in the same manner as in the preferred form of the invention.

In this modified form of wheel suspension all the cushioning effect is obtained from the tire of the wheel 11, the wheel and axle being rigidly connected to the frame of the scooter. The wheel and tire are readily removable from the right side of the scooter as in the preferred form of the invention by removing the wheel and tire from the hub flanges which are not illustrated in detail being the same as in the preferred form of the invention.

We have described our invention in two highly practical commercial embodiments thereof so that others may reproduce the same with such minor modifications as are desired without further disclosure. Obviously, the wheels could be made removable from the left side of the scooter by reversing our structure and friction belt drive could be substituted for the chain drive shown and still obtain the benefits of our suspension system.

Having thus described our invention, what we claim as new and desire to secure by Letters Patent, is:

1. Mounting structure for the rear wheel of a motor scooter having parallel side frame members comprising upwardly and rearwardly extending extensions on the rear ends of said frame members, ears secured to the front of the upwardly extending portions of said extensions, a tie bolt extending between said ears, a spacer sleeve positioned around said bolt and between said ears, bearings positioned around the ends of said spacer sleeves, a tubular sleeve rotatably mounted on said bearings, an angular suspension arm secured to said tubular sleeve and extending to the rear thereof, said arm having upwardly extending branches, a stub axle secured at the vertex of said arm and extending to the side of the plane thereof, a tie rod secured between the ends of said branches, a strut extending between said tie rod and said stub axle, spring plates secured to the rear ends of said extensions and the rear end of said suspension arm, coil springs secured between said spring plates, a wheel hub having a driving gear and brake mechanism thereon rotatably mounted on said stub axle, and an attaching flange formed on said hub to removably support said rear wheel.

2. Mounting structure for the rear wheel of a motor scooter having parallel side frame members comprising upwardly and rearwardly extending extensions on the rear ends of said frame members, ears secured to the upwardly extending portions of said extensions, a tie bolt extending between said ears, a spacer sleeve positioned around said bolt and between said ears, bearings positioned around said spacer sleeve, a tubular sleeve rotatably mounted on said bearings, an angular suspension arm secured to said tubular sleeve and extending to the rear thereof, said arm having upwardly extending branches, a stub axle secured at the vertex of said arm and extending to the side of the plane thereof, a tie rod secured between the ends of said branches, a strut extending between said tie rod and said stub axle, spring plates secured to the rear ends of said extensions and the rear end of said suspension arm, a coil spring secured between said spring plates, a wheel hub having a driving gear and brake mechanism thereon rotatably mounted on said stub axle, and an attaching flange formed on said hub to removably support said rear wheel.

3. Mounting structure for the rear wheel of a motor scooter having parallel side frame members comprising upwardly and rearwardly extending extensions on the ends of said frame members, ears secured to the upwardly extending portions of said extensions, a tie bolt extending between said ears, a spacer sleeve positioned around said bolt and clamped between said ears, a tubular sleeve rotatably mounted on said spacer sleeve, an angular suspension arm secured to said tubular sleeve and extending to the rear thereof, said arm being turned laterally at the rear end thereof and having upwardly extending branches, a stub axle secured at the vertex of said arm and extending to the same side thereof as the laterally turned rear end of said arm, a tie rod secured between said branches, a strut extending between said tie rod and said stub axle, spring plates secured to the rear end of said extensions and the laterally turned end of said suspension arm, coil springs secured between said spring plates, a wheel hub having a driving gear thereon rotatably mounted on said stub axle, and an attaching flange on said hub to removably support said rear wheel.

4. Mounting structure for the rear wheel of a motor scooter having parallel side frame members comprising upwardly and rearwardly extending extensions on the ends of said frame members, ears secured to the upwardly extending portions of said extensions, a tie bolt extending between said ears, a tubular sleeve rotatably mounted on said bolt, a suspension arm secured to said tubular sleeve and extending to the rear thereof, a stub axle secured to an intermediate portion of said arm, spring plates secured to the rear ends of said extensions and the rear end of said suspension arm, a coil spring secured between said spring plates, a wheel hub having a driving member thereon rotatably mounted on said stub axle, and an attaching flange on said hub to removably support said rear wheel.

5. A wheel support for the wheel of a motor scooter having a frame comprising an angular arm having one end pivotally mounted on said frame, said frame extending upwardly and rearwardly over said wheel, a spring positioned between the free end of said arm and the rear of said frame, a stub axle secured to said arm at the vertex thereof and extending laterally to one side of the plane thereof, a brace extending between the branches of said arm, a strut extending between said brace and said stub axle, a hub member mounted on said stub axle and having a driving gear and brake mechanism thereon, and an attaching flange on said hub member arranged to be connected to said wheel.

6. A wheel support for the wheel of a motor scooter having a frame comprising an angular arm having one end pivotally mounted on said frame, said frame extending upwardly and rearwardly over said wheel, springs positioned between the free end of said arm and the rear of said frame, a stub axle secured to said arm at the vertex thereof and extending laterally to one side of the plane thereof, a brace extending between the branches of said arm, a strut extending between said brace and the vertex of said arm, a hub member mounted on said stub axle and having a driving gear and brake mechanism thereon, and an attaching flange on said hub member arranged to be connected to said wheel.

7. A wheel support for the wheel of a motor scooter having a frame comprising an angular arm having one end pivotally mounted on said frame, springs positioned between the free end of said arm and said frame, a stub axle secured to said arm at the vertex thereof, a brace extending between the branches of said arm, a strut extending between said brace and said stub axle, a hub member mounted on said stub axle and having a driving gear thereon, and an attaching flange on said hub member arranged to be connected to said wheel.

8. Wheel suspension structure for the driving wheel of a motor scooter having parallel side frame members with a motor mounted thereon comprising upwardly and rearwardly extending extensions on the rear of said frame members, a tubular sleeve rotatably supported between the upwardly extending portions of said extensions, a suspension arm secured to said sleeve and extending to the rear thereof, a stub axle mounted on said arm and intermediate of the ends thereof, coil springs positioned between the free ends of said arm and said extension on said frame members, a hub member having a driving gear thereon rotatably mounted on said stub axle, said wheel being adapted to be removably secured over the free end of said hub, parallel arms extending forwardly from said tubular sleeve, a countershaft extending between said arms, driving sprockets rotatably mounted on said countershaft, a driving chain connected between said driving gear and driving sprockets, and an intermediate driving chain connecting said driving sprockets with said motor.

9. Wheel suspension structure for the driving wheel of a motor scooter having parallel side frame members with a motor mounted thereon comprising upwardly and rearwardly extending extensions on the rear of said frame members, a cross member rotatably supported between the upwardly extending portions of said extensions, a suspension arm secured to said cross member and extending to the rear thereof, a stub axle mounted on said arm and intermediate of the ends thereof, coil springs positioned between the free end of said arm and said extension on said frame members, a hub member having a driving member thereon rotatably mounted on said stub axle, said wheel being adapted to be removably secured to said hub, arms extending forwardly from said cross member, a countershaft mounted between said arms, driving sprockets rotatably mounted on said countershaft, a driving chain connected between said driving member and driving sprockets, and an intermediate driving chain connecting said driving sprockets with said motor.

10. Wheel suspension structure for the driving wheel of a motor scooter having parallel side frame members with the motor mounted thereon comprising upwardly and rearwardly extending extensions on the rear of said frame members, a cross member rotatably supported between the upwardly extending portions of said extensions, a suspension arm secured to said cross member and extending to the rear thereof, a stub axle mounted on said arm and intermediate of the ends thereof, coil springs positioned between the free ends of said arm and said extension on said frame members, a hub member having a driving member thereon rotatably mounted on said stub axle, said wheel being adapted to be removably secured to said hub, a support member extending forwardly from said cross member, a countershaft mounted on said support member, an intermediate driving member rotatable about the axis of said countershaft, a flexible driving member looped around said first driving member and said intermediate driving member, and an intermediate flexible driving member connecting said intermediate driving member with said motor.

11. In a structure of the class described, the combination of frame side members having upwardly and rearwardly extending extensions at their rear ends, a cross piece on the rear ends of said extensions, an axle supporting arm pivotally mounted on the upwardly extending portions of said side member extensions, a stub axle carried by said arm and provided with a demountable wheel hub, said arm having a rearward extension beyond the axle, a cross piece on said arm, and a pair of coiled springs connected to said cross piece on said frame extensions and to said cross piece on said arm in balancing relation to the axle, the frame extensions being spaced substantially above and in front of said axle permitting the lateral engagement and disengagement of a wheel with said hub on said axle without disturbing the frame parts.

CLARA M. GOLDAMMER.
FRED GOLDAMMER.

REFERENCES CITED

The following references are of record in the file of this patent:

UNITED STATES PATENTS

| Number | Name | Date |
|---|---|---|
| 1,331,747 | Fisker | Feb. 24, 1920 |
| 2,143,329 | Mohl | Jan. 10, 1939 |
| 2,258,449 | Grabach | Oct. 7, 1941 |

FOREIGN PATENTS

| Number | Country | Date |
|---|---|---|
| 242,396 | Germany | Jan. 9, 1912 |
| 255,026 | Italy | Oct. 4, 1927 |
| 354,152 | Great Britain | Aug. 6, 1931 |
| 130,299 | Austria | Nov. 10, 1932 |